(No Model.)

E. J. THOMAS.
FEED CUP.

No. 280,532. Patented July 3, 1883.

Witnesses,
Geo. H. Strong.
J. H. Krouse.

Inventor
E. J. Thomas
By Dewey & Co.
Attorneys

UNITED STATES PATENT OFFICE.

EDWARD J. THOMAS, OF OAKLAND, CALIFORNIA.

FEED-CUP.

SPECIFICATION forming part of Letters Patent No. 280,532, dated July 3, 1883.

Application filed October 2, 1882. (No model.)

*To all whom it may concern:*

Be it known that I, EDWARD J. THOMAS, of Oakland, county of Alameda, State of California, have invented an Improved Feed-Cup for Bird-Cages; and I do hereby declare the following to be a full, clear, and exact description thereof.

My invention relates to a new and useful improvement in feed-cups for bird-cages; and it consists in an inwardly-extending lip or flange placed in the throat or neck of the cup, as will hereinafter be fully seen.

The object of my invention is to prevent the bird from scattering the seed or other contents of the cup upon the floor of the cage.

This object is accomplished by the intervention of the lip or flange in the throat of the cup, whereby the body of seed is guarded in front, and the opening is thrown far enough back to prevent the bird from scratching the seed out with his bill.

Figure 1:
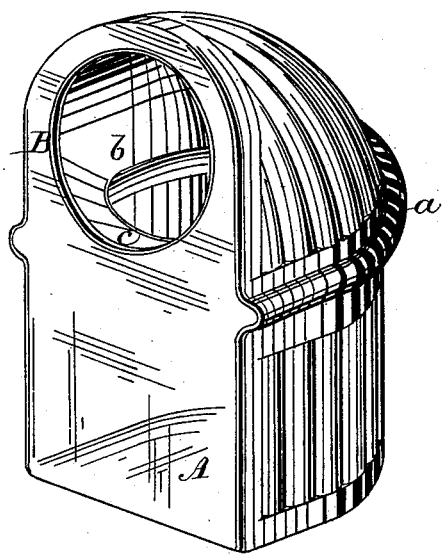
Figure 2:
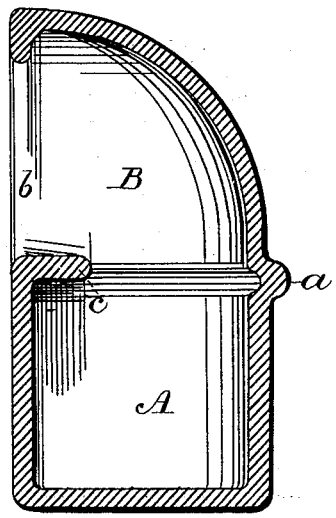

Referring to the accompanying drawings, Figure 1 is a perspective view of my device. Fig. 2 is a vertical section.

Let A represent the usual form of feed-cups for bird-cages. It is a vessel usually made of glass, having a bead, $a$, around its middle to support it in the wire socket made for it, and surmounted by a half-dome or hood, B, the front of which has the opening $b$ or entrance to the interior of the cup.

The front wall of the cup usually comes up straight, so that nothing prevents the bird from scratching out the seed over the edge of the cup with his bill. To prevent this I make the cup with an inwardly-projecting lip or flange, $c$, extending from the front into the throat or neck. This has the effect of guarding the front portion of the body of seed and throwing the rest so far in that the bird cannot well pick the seeds over the edge, as the flange and his intervening body prevent, thereby avoiding waste and the litter which is usually made by scattering the seed over the floor of the cage. There are a number of ways in which this lip may be made. If the cup is made of glass, it may be molded with it. If made of other material or of several materials, any inwardly-turned edge at this point will answer.

Having thus described my invention, what I claim as new, and desire to secure by Letters Patent, is—

A feed-cup, A, for bird-cages, having a supporting-bead, $a$, and a top, B, formed integral therewith, and provided with a front opening, $b$, said cup having a lip or flange, $c$, extending inwardly from the front wall of the cup into its neck or throat, substantially as shown, and for the purpose herein described.

In witness whereof I hereunto set my hand.

EDWARD J. THOMAS.

Witnesses:
A. MAYERS,
J. H. BLOOD.